United States Patent
Song et al.

(10) Patent No.: US 9,785,266 B2
(45) Date of Patent: Oct. 10, 2017

(54) REMOTE CONTROL METHOD AND APPARATUS

(71) Applicant: Huawei Technologies Co., Ltd., Shenzhen (CN)

(72) Inventors: Xingguang Song, Beijing (CN); Shiguo Lian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/094,360

(22) Filed: Apr. 8, 2016

(65) Prior Publication Data

US 2016/0342224 A1    Nov. 24, 2016

(30) Foreign Application Priority Data

May 19, 2015    (CN) .......................... 2015 1 0257853

(51) Int. Cl.
*G06F 3/038* (2013.01)
*H04L 12/18* (2006.01)
(Continued)

(52) U.S. Cl.
CPC .......... *G06F 3/038* (2013.01); *G06F 3/03542* (2013.01); *G06F 3/1462* (2013.01); *H04L 12/1813* (2013.01); *H04N 7/142* (2013.01)

(58) Field of Classification Search
CPC .... G06F 3/038; G06F 3/03542; G06F 3/1463; H04L 12/1813; H04N 7/142
See application file for complete search history.

(56) References Cited

U.S. PATENT DOCUMENTS

| 2007/0019066 A1 | 1/2007 | Cutler et al. |
| 2011/0164163 A1 | 7/2011 | Bilbrey et al. |

(Continued)

FOREIGN PATENT DOCUMENTS

| CN | 103365572 A | 10/2013 |
| CN | 103631471 A | 3/2014 |
| WO | 0058933 A1 | 10/2000 |

OTHER PUBLICATIONS

Partial English Translation and Abstract of Chinese Patent Application No. CN103631471, Oct. 6, 2016, 38 pages.

(Continued)

*Primary Examiner* — Liliana Cerullo
(74) *Attorney, Agent, or Firm* — Conley Rose, P.C.

(57) ABSTRACT

A method relates to the field of multimedia technologies, and in particular, to a remote control method and apparatus, which are used to implement remote control on a terminal, includes obtaining a presentation image, where the presentation image is an image used to present an operation performed on a terminal, detecting a presentation screen picture in the presentation image according to detection parameter information of the terminal, where the presentation screen picture is a screen picture of the terminal in the presentation image, determining a mapping relationship between a pixel on the presentation screen picture and a pixel on a display screen of the terminal according to parameter information of the presentation screen picture and screen parameter information of the terminal, and controlling the terminal according to information about an operation by a user on the presentation screen picture, and the mapping relationship.

18 Claims, 12 Drawing Sheets

(51) Int. Cl.
*G06F 3/0354* (2013.01)
*G06F 3/14* (2006.01)
*H04N 7/14* (2006.01)

(56) References Cited

U.S. PATENT DOCUMENTS

| | | | |
|---|---|---|---|
| 2012/0167001 A1* | 6/2012 | Ortiz | G06F 3/005 |
| | | | 715/781 |
| 2013/0113738 A1* | 5/2013 | Lee | G06F 3/0488 |
| | | | 345/173 |
| 2013/0137482 A1 | 5/2013 | Sheikh et al. | |
| 2014/0223490 A1 | 8/2014 | Pan et al. | |

OTHER PUBLICATIONS

Gauglitz, S., et al., "World-Stabilized Annotations and Virtual Scene Navigation for Remote Collaboration," ACM, May 14, 2010, 11 pages.
Foreign Communication From a Counterpart Application, European Application No. 16163700.4, Extended European Search Report dated Sep. 27, 2016, 8 pages.
Machine Translation and Abstract of Chinese Publication No. CN103365572, dated Oct. 23, 2013, 13 pages.
Foreign Communication From A Counterpart Application, Chinese Application No. 201510257853.8, Chinese Office Action dated Jun. 20, 2017, 7 pages.

\* cited by examiner

REMOTE CONTROL METHOD AND APPARATUS

CROSS-REFERENCE TO RELATED APPLICATION

This application claims priority to Chinese Patent Application No. 201510257853.8, filed on May 19, 2015, which is hereby incorporated by reference in its entirety.

TECHNICAL FIELD

The present disclosure relates to the field of multimedia technologies, and in particular, to a remote control method and apparatus.

BACKGROUND

Currently, there are more categories and functions of electronic devices, which greatly facilitates life of people. When a terminal product is designed, if it is inconvenient to directly present the product to a visitor, the product may be remotely presented to the visitor. Generally, the presenter needs to introduce use of the product while allowing a user to control the terminal for personal experience.

In an existing remote control manner, a control end needs to obtain a control right for a controlled end by establishing a connection to the controlled end, and display screen content of the controlled end on a display screen of the control end. Even though remote control can be implemented in the remote control manner, a terminal presentation requirement cannot be met. For example, according to this manner, a user cannot see, on the control end, information (for example, a housing of a terminal) about the terminal (that is, the controlled end) except screen content, and after the controlled end submits the control right for the terminal to the control end, the presenter cannot present, at the controlled end, a process of using the terminal. Obviously, this remote control manner affects effects of remote presentation of the terminal.

SUMMARY

Embodiments of the present disclosure provide a remote control method and apparatus in order to implement remote control on a terminal if both information about the terminal except screen content and content that is presented by a presenter can be presented.

According to a first aspect, a remote control method is provided, including obtaining a presentation image, where the presentation image is an image used to present an operation performed on a terminal, detecting a presentation screen picture in the presentation image according to detection parameter information of the terminal, where the presentation screen picture is a screen picture of the terminal in the presentation image, determining a mapping relationship between a pixel on the presentation screen picture and a pixel on a display screen of the terminal according to parameter information of the presentation screen picture and screen parameter information of the terminal, and controlling the terminal according to information about an operation by a user on the presentation screen picture, and the mapping relationship.

With reference to the first aspect, in a first possible implementation manner, the information about the operation includes operation action information and first operation position information, and the first operation position information includes information about a first pixel set that is operated on the presentation screen picture, and controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and controlling the terminal according to the information about the second pixel set and the operation action information.

With reference to the first aspect, in a second possible implementation manner, the information about the operation includes first operation position information, and the first operation position information includes information about a first pixel set that is operated on the presentation screen picture, and controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and moving, on the display screen of the terminal, a track icon to a position of the second pixel set.

With reference to the first aspect, or the first or second possible implementation manner of the first aspect, in a third possible implementation manner, the parameter information of the presentation screen picture includes at least one of the following information: a width value of the presentation screen picture, a height value of the presentation screen picture, and coordinate values, in the presentation image, of a reference pixel on the presentation screen picture, and the screen parameter information includes screen resolution of the terminal, and determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values, in the presentation image, of the reference pixel on the presentation screen picture, and the screen resolution of the terminal.

With reference to the third possible implementation manner of the first aspect, in a fourth possible implementation manner, the mapping relationship between a pixel on the presentation screen picture and a pixel on the display screen of the terminal is determined according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

With reference to first aspect, or the first or second possible implementation manner of the first aspect, in a fifth possible implementation manner, the screen parameter information of the terminal includes placement status information of the terminal and screen resolution of the terminal, and the parameter information of the presentation screen picture includes a width value of the presentation screen picture, a height value of the presentation screen picture, and coordinate values, in the presentation image, of a reference pixel on the presentation screen picture, and determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values of the reference pixel in the presentation image, the screen resolution of the terminal, and the placement status information of the terminal.

With reference to the fifth possible implementation manner of the first aspect, in a sixth possible implementation manner, the placement status information includes an oblique angle of a placement status of the terminal relative to a reference state, where the oblique angle is an angle by which the placement status of the terminal rotates on the presentation image along a counterclockwise direction relative to the reference state, when the placement status of the terminal is the reference state, a direction of a top edge of the display screen is a horizontal direction, and a direction of a side edge of the display screen is a vertical direction, the mapping relationship between a pixel on the presentation screen picture and a pixel on the display screen of the terminal is determined according to the following formulas:

$$Gx = \frac{CW\sqrt{(X-PtX)^2(Y-PtY)^2}\cos\theta}{TrX}, \text{ and}$$

$$Gy = \frac{CH\sqrt{(X-PtX)^2(Y-PtY)^2}\sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and $\theta$ is an angle value that is determined based on an angle value $\beta$ of the oblique angle, or $\theta$ is an angle value of a first acute included angle between a connection line, which is between the pixel (X, Y) and the reference pixel (PtX, PtY), and the direction of the top edge of the display screen.

With reference to the sixth possible implementation manner of the first aspect, in a seventh possible implementation manner, determining the angle value $\theta$ of the first acute included angle based on the angle value $\beta$ of the oblique angle includes, when the angle value $\beta$ of the oblique angle is 0, determining that the angle value $\theta$ of the first acute included angle is $\alpha$, where a is an angle value of a second acute included angle between a connection line, which is between the pixel (X, Y) and the reference pixel (PtX, PtY), and a horizontal direction, or when the angle value $\beta$ of the oblique angle is greater than 0, and the angle value $\beta$ of the oblique angle is less than $\pi$, determining that the angle value $\theta$ of the first acute included angle is a difference obtained by subtracting an angle value $\alpha$ from the angle value $\beta$ of the oblique angle, or when the angle value $\beta$ of the oblique angle is greater than or equal to $\pi$, and the angle value $\beta$ of the oblique angle is less than $3\pi/2$, determining that the angle value $\theta$ of the first acute included angle is a value obtained by subtracting $\pi$ from a sum of the angle value $\beta$ of the oblique angle and an angle value $\alpha$, or when the angle value $\beta$ of the oblique angle is greater than or equal to $3\pi/2$, and the angle value $\beta$ of the oblique angle is less than $2\pi$, determining that the angle value $\theta$ of the first acute included angle is a value obtained by subtracting an angle value $\alpha$ and $\pi$ from the angle value $\beta$ of the oblique angle.

With reference to the first aspect, or any one of the first to seventh possible implementation manners of the first aspect, in an eighth possible implementation manner, detecting a presentation screen picture in the presentation image according to detection parameter information of the terminal includes detecting all objects having a quadrilateral outline in the presentation image, and finding out a presentation screen picture having a quadrilateral outline of the terminal from all the detected objects having a quadrilateral outline, where the quadrilateral outline of the terminal matches the detection parameter information of the terminal.

With reference to the eighth possible implementation manner of the first aspect, in a ninth possible implementation manner, detecting all objects having a quadrilateral outline in the presentation image includes detecting all the objects having a quadrilateral outline in a determined image detection range of the presentation image.

With reference to the ninth possible implementation manner of the first aspect, in a tenth possible implementation manner, the image detection range is determined according to at least one of the following information, which includes information about a movement of the presentation screen picture in the presentation image, information about a hand position, in the presentation image, of a presenter that presents an operation performed on the terminal, and information about a preset area range.

According to a second aspect, a remote control apparatus is provided, including an obtaining module, configured to obtain a presentation image, where the presentation image is an image used to present an operation performed on a terminal, a detection module, configured to detect, according to detection parameter information of the terminal, a presentation screen picture in the presentation image obtained by the obtaining module, where the presentation screen picture is a screen picture of the terminal in the presentation image, a determining module, configured to determine a mapping relationship between a pixel on the presentation screen picture and a pixel on a display screen of the terminal according to parameter information of the presentation screen picture detected by the detection module and screen parameter information of the terminal, and a control module, configured to control the terminal according to information about an operation by a user on the presentation screen picture, and the mapping relationship determined by the determining module.

With reference to the second aspect, in a first possible implementation manner, the first operation position information includes information about a first pixel set that is operated on the presentation screen picture, and the control module is further configured to obtain information about a second pixel set, which corresponds to the first pixel set, on the display screen of the terminal according to the information about the first pixel set and the mapping relationship, and control the terminal according to the information about the second pixel set and the operation action information.

With reference to the second aspect, in a second possible implementation manner, the information about the operation includes first operation position information, and the first operation position information includes information about a first pixel set that is operated on the presentation screen picture, and the control module is further configured to obtain information about a second pixel set, which corresponds to the first pixel set, on the display screen of the terminal according to the information about the first pixel set and the mapping relationship, and move, on the display screen of the terminal, a track icon to a position of the second pixel set.

With reference to the second aspect, or the first or second possible implementation manner of the second aspect, in a third possible implementation manner, the parameter information of the presentation screen picture includes at least one of the following information: a width value of the presentation screen picture, a height value of the presentation screen picture, and coordinate values, in the presentation image, of a reference pixel on the presentation screen picture, and the screen parameter information includes screen resolution of the terminal, and the determining module is further configured to determine the mapping relationship between a pixel on the presentation screen picture and a pixel on the display screen according to the width value of the presentation screen picture, the height value of the presentation screen picture, the coordinate values, in the presentation image, of the reference pixel on the presentation screen picture, and the screen resolution of the terminal.

With reference to the third possible implementation manner of the second aspect, in a fourth possible implementation manner, the determining module is further configured to determine the mapping relationship between a pixel on the presentation screen picture and a pixel on the display screen of the terminal according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

With reference to second aspect, or the first or second possible implementation manner of the second aspect, in a fifth possible implementation manner, the screen parameter information of the terminal includes placement status information of the terminal and screen resolution of the terminal, and the parameter information of the presentation screen picture includes a width value of the presentation screen picture, a height value of the presentation screen picture, and coordinate values, in the presentation image, of a reference pixel on the presentation screen picture, and the determining module is further configured to determine the mapping relationship between a pixel on the presentation screen picture and a pixel on the display screen according to the width value of the presentation screen picture, the height value of the presentation screen picture, the coordinate values of the reference pixel in the presentation image, the screen resolution of the terminal, and the placement status information of the terminal.

With reference to the fifth possible implementation manner of the second aspect, in a sixth possible implementation manner, the placement status information includes an oblique angle of a placement status of the terminal relative to a reference state, where the oblique angle is an angle by which the placement status of the terminal rotates on the presentation image along a counterclockwise direction relative to the reference state, when the placement status of the terminal is the reference state, a direction of a top edge of the display screen is a horizontal direction, and a direction of a side edge of the display screen is a vertical direction. The determining module is further configured to determine the mapping relationship between a pixel on the presentation screen picture and a pixel on the display screen of the terminal according to the following formulas:

$$Gx = \frac{CW\sqrt{(X - PtX)^2(Y - PtY)^2}\cos\theta}{TrX}, \text{ and}$$

$$Gy = \frac{CH\sqrt{(X - PtX)^2(Y - PtY)^2}\sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and θ is an angle value that is determined based on an angle value β of the oblique angle, or θ is an angle value of a first acute included angle between a connection line, which is between the pixel (X, Y) and the reference pixel (PtX, PtY), and the direction of the top edge of the display screen.

With reference to the sixth possible implementation manner of the second aspect, in a seventh possible implementation manner, the determining module is further configured to, when the angle value β of the oblique angle is 0, determine that the angle value θ of the first acute included angle is α, where α is an angle value of a second acute included angle between a connection line, which is between the pixel (X, Y) and the reference pixel (PtX, PtY), and a horizontal direction, or when the angle value β of the oblique angle is greater than 0, and the angle value β of the oblique angle is less than π, determine that the angle value θ of the first acute included angle is a difference obtained by subtracting an angle value α from the angle value β of the oblique angle, or when the angle value β of the oblique angle is greater than or equal to π, and the angle value β of the oblique angle is less than 3π/2, determine that the angle value θ of the first acute included angle is a value obtained by subtracting π from a sum of the angle value β of the oblique angle and an angle value α, or when the angle value β of the oblique angle is greater than or equal to 3π/2, and the angle value β of the oblique angle is less than 2π, determine that the angle value θ of the first acute included angle is a value obtained by subtracting an angle value α and π from the angle value β of the oblique angle.

With reference to the second aspect, or any one of the first to seventh possible implementation manners of the second aspect, in an eighth possible implementation manner, the detection module is further configured to detect all objects having a quadrilateral outline in the presentation image, and find out a presentation screen picture having a quadrilateral outline of the terminal from all the detected objects having a quadrilateral outline, where the quadrilateral outline of the terminal matches the detection parameter information of the terminal.

With reference to the eighth possible implementation manner of the second aspect, in a ninth possible implementation manner, the detection module is further configured to detect all the objects having a quadrilateral outline in a determined image detection range of the presentation image.

With reference to the ninth possible implementation manner of the second aspect, in a tenth possible implementation manner, the detection module is further configured to determine the image detection range according to at least one of the following information, which includes information about a movement of the presentation screen picture in the presentation image, information about a hand position, in the presentation image, of a presenter that presents an operation performed on the terminal, and information about a preset area range.

According to a third aspect, a remote control device is provided, including a processor, a memory, and a bus, where the memory stores an executable instruction, and when the remote control device runs, the processor communicates with the memory using the bus such that the processor performs the following executable instruction: obtaining a presentation image, where the presentation image is an image used to present an operation performed on a terminal, detecting a presentation screen picture in the presentation image according to detection parameter information of the terminal, where the presentation screen picture is a screen picture of the terminal in the presentation image, determining a mapping relationship between a pixel on the presentation screen picture and a pixel on a display screen of the terminal according to parameter information of the presentation screen picture and screen parameter information of the terminal, and controlling the terminal according to information about an operation by a user on the presentation screen picture, and the mapping relationship.

With reference to the third aspect, in a first possible implementation manner, the information about the operation includes operation action information and first operation position information, and the first operation position information includes information about a first pixel set that is operated on the presentation screen picture, and in the executable instruction performed by the processor, controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and controlling the terminal according to the information about the second pixel set and the operation action information.

With reference to the third aspect, in a second possible implementation manner, the information about the operation includes first operation position information, and the first operation position information includes information about a first pixel set that is operated on the presentation screen picture, and in the executable instruction performed by the processor, controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and moving, on the display screen of the terminal, a track icon to a position of the second pixel set.

With reference to the third aspect, or the first or second possible implementation manner of the third aspect, in a third possible implementation manner, the parameter information of the presentation screen picture includes at least one of the following information: a width value of the presentation screen picture, a height value of the presentation screen picture, and coordinate values, in the presentation image, of a reference pixel on the presentation screen picture, and the screen parameter information includes screen resolution of the terminal, and in the executable instruction performed by the processor, determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values, in the presentation image, of the reference pixel on the presentation screen picture, and the screen resolution of the terminal.

With reference to the third possible implementation manner of the third aspect, in a fourth possible implementation manner, in the executable instruction performed by the processor, the mapping relationship between a pixel on the presentation screen picture and a pixel on the display screen of the terminal is determined according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

With reference to the third aspect, or the first or second possible implementation manner of the third aspect, in a fifth possible implementation manner, the screen parameter information of the terminal includes placement status information of the terminal and screen resolution of the terminal, and the parameter information of the presentation screen picture includes a width value of the presentation screen picture, a height value of the presentation screen picture, and coordinate values, in the presentation image, of a reference pixel on the presentation screen picture, and in the executable instruction performed by the processor, the determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values of the reference pixel in the presentation image, the screen resolution of the terminal, and the placement status information of the terminal.

With reference to the fifth possible implementation manner of the third aspect, in a sixth possible implementation manner, the placement status information includes an oblique angle of a placement status of the terminal relative to a reference state, where the oblique angle is an angle by which the placement status of the terminal rotates on the presentation image along a counterclockwise direction relative to the reference state, when the placement status of the terminal is the reference state, a direction of a top edge of the display screen is a horizontal direction, and a direction of a side edge of the display screen is a vertical direction, in the executable instruction performed by the processor, the mapping relationship between a pixel on the presentation screen picture and a pixel on the display screen of the terminal is determined according to the following formulas:

$$Gx = \frac{CW\sqrt{(X-PtX)^2(Y-PtY)^2}\cos\theta}{TrX}, \text{ and}$$

$$Gy = \frac{CH\sqrt{(X-PtX)^2(Y-PtY)^2}\sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and θ is an angle value that is determined based on an angle value β of the oblique angle, or θ is an angle value of a first acute included angle between a connection line, which is between the pixel (X, Y) and the reference pixel (PtX, PtY), and the direction of the top edge of the display screen.

With reference to the sixth possible implementation manner of the third aspect, in a seventh possible implementation manner, in the executable instructions performed by the processor, determining the angle value θ of the first acute included angle based on the angle value β of the oblique angle includes, when the angle value β of the oblique angle is 0, determining that the angle value θ of the first acute included angle is α, where α is an angle value of a second acute included angle between a connection line, which is between the pixel (X, Y) and the reference pixel (PtX, PtY), and a horizontal direction, or when the angle value β of the oblique angle is greater than 0, and the angle value β of the oblique angle is less than π, determining that the angle value θ of the first acute included angle is a difference obtained by subtracting an angle value α from the angle value β of the oblique angle, or when the angle value β of the oblique angle is greater than or equal to π, and the angle value β of the oblique angle is less than 3π/2, determining that the angle value θ of the first acute included angle is a value obtained by subtracting π from a sum of the angle value β of the oblique angle and an angle value α, or when the angle value β of the oblique angle is greater than or equal to 3π/2, and the angle value β of the oblique angle is less than 2π, determining that the angle value θ of the first acute included angle is a value obtained by subtracting an angle value α and π from the angle value β of the oblique angle.

With reference to the third aspect, or any one of the first to seventh possible implementation manners of the third aspect, in an eighth possible implementation manner, in the executable instruction performed by the processor, detecting a presentation screen picture in the presentation image according to detection parameter information of the terminal includes detecting all objects having a quadrilateral outline in the presentation image, and finding out a presentation screen picture having a quadrilateral outline of the terminal from all the detected objects having a quadrilateral outline, where the quadrilateral outline of the terminal matches the detection parameter information of the terminal.

With reference to the eighth possible implementation manner of the third aspect, in a ninth possible implementation manner, in the executable instruction performed by the processor, detecting all objects having a quadrilateral outline in the presentation image includes detecting all the objects having a quadrilateral outline in a determined image detection range of the presentation image.

With reference to the ninth possible implementation manner of the third aspect, in a tenth possible implementation manner, in the executable instructions performed by the processor, the image detection range is determined according to at least one of the following information, which includes information about a movement of the presentation screen picture in the presentation image, information about a hand position, in the presentation image, of a presenter that presents an operation performed on the terminal, and information about a preset area range.

According to the solution provided by any of the foregoing aspects, an image collection device is used to collect a presentation image used to present an operation performed on a terminal, the presentation image is presented to a visitor at a remote end, a presentation screen picture of the terminal is detected in the presentation image, and a mapping relationship between a pixel on the presentation screen picture of the terminal in the presentation image and a pixel on an actual display screen of the terminal is established, and the terminal is controlled according to information about an operation by a user on the presentation screen picture of the terminal, and the mapping relationship. Therefore, according to the embodiments of the present disclosure, not only both information (for example, a shape and an appearance of a housing of a terminal) about the terminal except screen content and content that is presented by a presenter can be presented in the presentation image, but also remote control on the terminal can be implemented.

DESCRIPTION OF EMBODIMENTS

A basic idea of the embodiments of the present disclosure is to collect, using an image collection device, a presentation image used to present an operation performed on a terminal, present the presentation image to a visitor at a remote end, detect a presentation screen picture of the terminal in the presentation image, and establish a mapping relationship between a pixel on the presentation screen picture of the terminal in the presentation image and a pixel on an actual display screen of the terminal, and control the terminal according to information about an operation by a user on the presentation screen picture of the terminal, and the mapping relationship. Therefore, according to the embodiments of the present disclosure, not only both information (for example, a shape and an appearance of a housing of a terminal) about the terminal except screen content and content that is presented by a presenter can be presented in the presentation image, but also remote control on the terminal can be implemented.

The embodiments of the present disclosure are further described below in detail with reference to the accompanying drawings of the specification.

Embodiment 1

Figure 1:
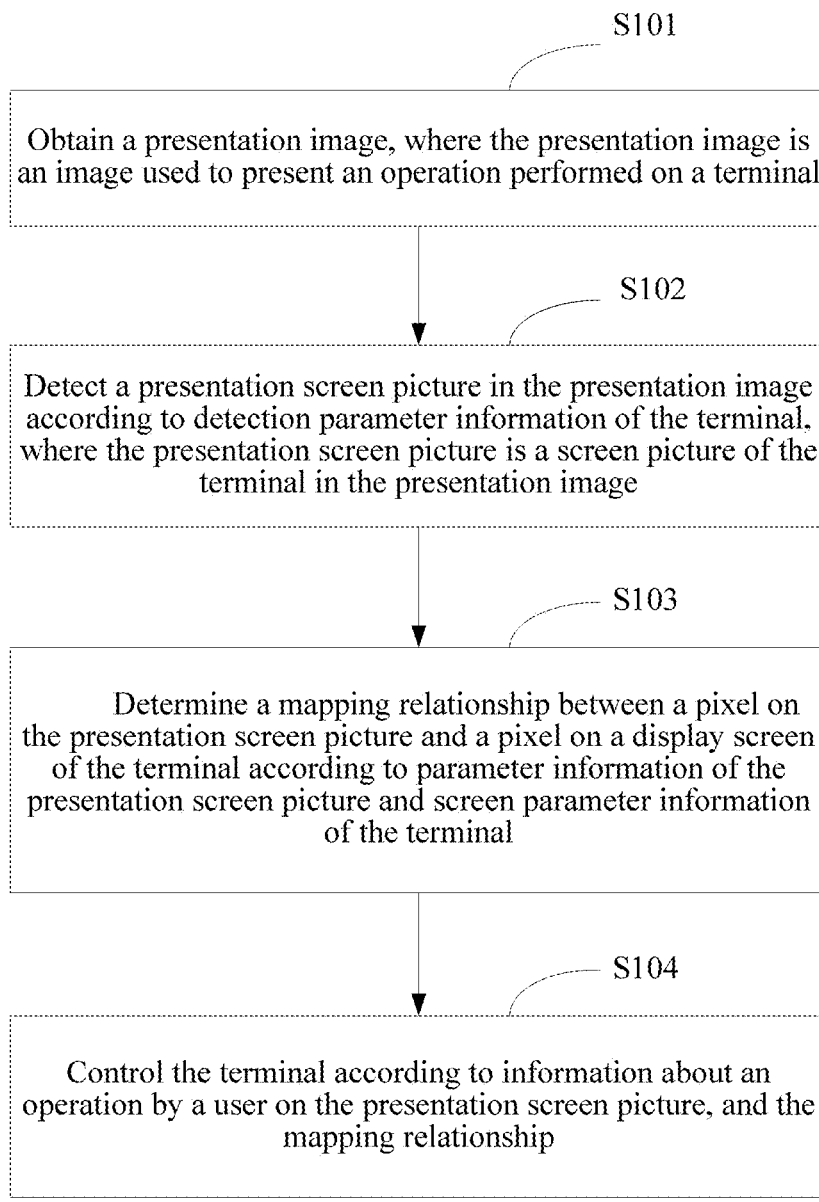
FIG. 1 is a flowchart of a remote control method according to Embodiment 1 of the present disclosure.

FIG. 1 is a flowchart of a remote control method according to Embodiment 1 of the present disclosure. The method includes the following steps.

Step S101: Obtain a presentation image, where the presentation image is an image used to present an operation performed on a terminal.

In specific implementation, an image collection device may be used to collect the presentation image generated when a presenter presents the operation performed on the terminal. The presenter herein is a user presenting a terminal operation process to another user.

The terminal in this embodiment of the present disclosure may be a mobile terminal, or a terminal having a touchscreen.

Step S102: Detect a presentation screen picture in the presentation image according to detection parameter information of the terminal, where the presentation screen picture is a screen picture of the terminal in the presentation image.

In specific implementation, an entity for executing this embodiment of the present disclosure may be a control device independent of the terminal, for example, may be an independent personal computer (PC) or a function module installed on the terminal, which is not limited in this embodiment of the present disclosure.

In a specific implementation process, the presentation screen picture (that is, the screen picture of the terminal in the presentation image) matching the detection parameter information of the terminal may be detected in the presentation image according to the detection parameter information, such as one or more of an aspect ratio (a ratio of a width to a height, where herein, a width value of the terminal may be considered as a length value of a top edge of a display screen of the terminal, and a height value may be considered as a length value of a side edge of the display screen of the terminal) of the terminal, screen resolution (herein, the screen resolution may include resolution (which corresponds to the width value) of the display screen of the terminal in a direction of the top edge, and resolution (which corresponds to the height value) in a direction of the side edge), placement status information (such as a horizontal screen, a vertical screen, and a placement oblique angle) of the terminal. Herein, the presentation image collected by the image collection device may include an image of a presenter, an image (which includes the presentation screen picture of the terminal) of the terminal, and another background image. In this embodiment of the present disclosure, the presentation screen picture related to the operation by a user needs to be detected from the presentation image, which is a basis for step S103.

Step S103: Determine a mapping relationship between a pixel on the presentation screen picture and a pixel on a display screen of the terminal according to parameter information of the presentation screen picture and screen parameter information of the terminal.

Herein, the parameter information of the presentation screen picture may include at least one of the following information: a width value of the presentation screen picture, a height value of the presentation screen picture, and coordinate values, in the presentation image, of a reference pixel on the presentation screen picture. The screen parameter information of the terminal may include at least one of the following information: screen resolution of the terminal, placement status information of the terminal, and a width value and a height value of the terminal.

After the presentation screen picture of the terminal in the presentation image is detected in step S102, a mapping relationship between coordinate values, in the presentation image, of a pixel on the presentation screen picture and coordinate values, of a pixel on an actual display screen of the terminal, on the display screen of the terminal may be established such that an operation position, on the presentation screen picture in the presentation image, of a user is converted into an operation position on the actual display screen of the terminal based on the mapping relationship.

Step S104: Control the terminal according to information about an operation by a user on the presentation screen picture, and the mapping relationship.

The user herein is a user that operates the presentation screen picture in the presentation image, and is a visitor corresponding to the presenter.

The information about the operation herein may include operation action information and first operation position information, and the first operation position information includes information about a first pixel set that is operated on the presentation screen picture.

In step S104, controlling the terminal according to information about an operation by a user on the presentation screen picture, and the mapping relationship may include obtaining information about a second pixel set, which corresponds to the first pixel set, on the display screen of the terminal according to the information about the first pixel set and the mapping relationship, and controlling the terminal according to the information about the second pixel set and the operation action information. Alternatively, a roaming operation may be performed according to only the information about the first pixel set, that is, information about a second pixel set, which corresponds to the first pixel set, on the display screen of the terminal is obtained according to the information about the first pixel set and the mapping relationship. A track icon on the display screen of the terminal is moved according to the information about the second pixel set. For details, refer to descriptions in the following embodiment.

An idea of this embodiment of the present disclosure is further described below in detail using Embodiment 2.

Embodiment 2

Figure 2:
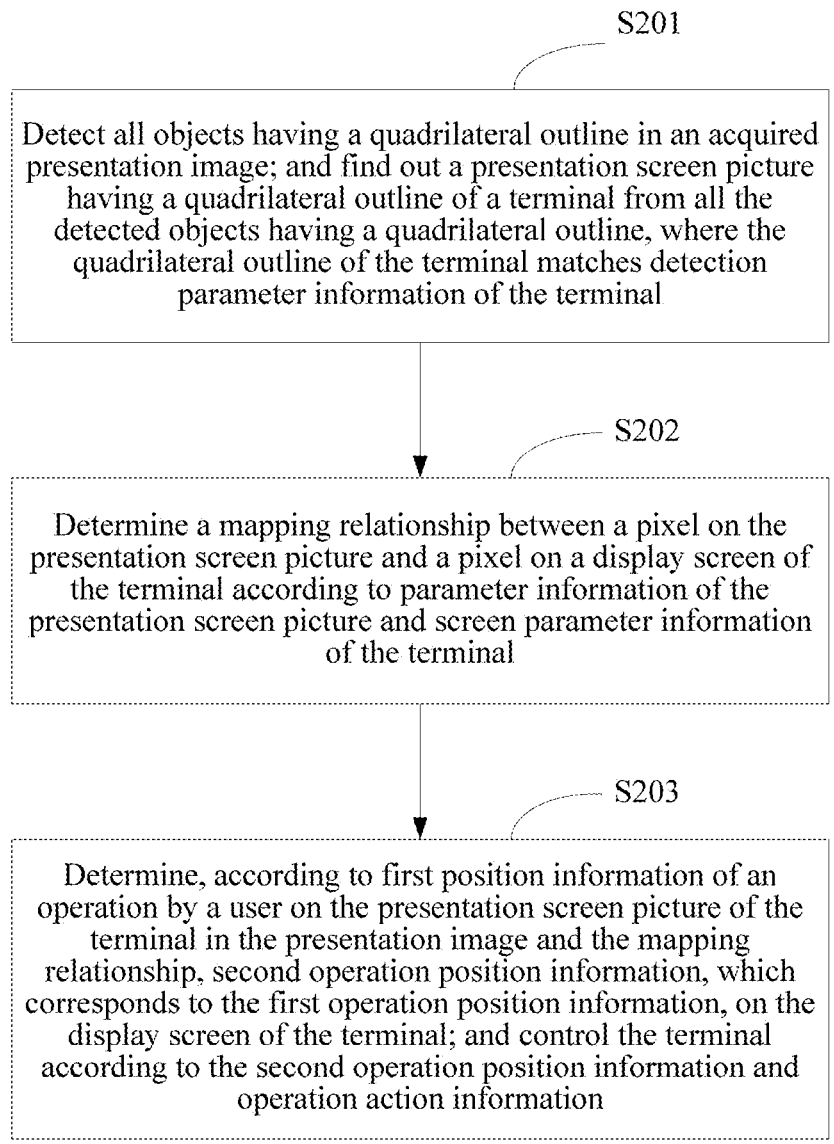
FIG. 2 is a flowchart of a remote control method according to Embodiment 2 of the present disclosure.

FIG. 2 is a flowchart of a remote control method according to Embodiment 2 of the present disclosure. The method includes the following steps.

Step S201: Detect all objects having a quadrilateral outline in an acquired presentation image, and find out a presentation screen picture having a quadrilateral outline of a terminal from all the detected objects having a quadrilateral outline, where the quadrilateral outline of the terminal matches detection parameter information of the terminal.

The quadrilateral outline in this embodiment of the present disclosure may be an outline of a quadrilateral whose four angles have an arc.

Herein, the detection parameter information of the terminal may include one or more of an aspect ratio, screen resolution, and placement status information of the terminal. If the detection parameter information includes the screen resolution of the terminal and does not include the aspect ratio, the aspect ratio of the terminal may be obtained through calculation according to the screen resolution, for example, a quantity, which corresponds to the screen resolution, of pixels in a direction of a top edge of a display screen is 600 (that is, a width value), a quantity, which corresponds to the screen resolution, of pixels in a direction of a side edge of the display screen is 800 (that is, a height value), and the aspect ratio of the terminal is 3:4. In specific implementation, a default placement state of the terminal may be set, for example, the default placement state is the direction of the top edge of the display screen of the terminal is a horizontal direction, and the direction of the side edge of the display screen of the terminal is a vertical direction. In this case, a presenter (a user presenting an operation performed on the terminal) is required to set the terminal to the default placement state when presenting the terminal. If the terminal is not set to the default placement state, a current placement angle of the terminal may be indicated using the placement status information, that is, an oblique angle of a placement status of the terminal relative to a reference state, and the reference state may be just the default placement state.

In specific implementation, if an entity for executing this embodiment of the present disclosure is an entity independent of the terminal, parameter information transmitted by the terminal needs to be acquired. Furthermore, the terminal may transmit, through wireless transmission, the parameter information to the entity for executing this embodiment of the present disclosure.

Optionally, detecting all objects having a quadrilateral outline in a presentation image includes detecting all the objects having a quadrilateral outline in a determined image detection range of the presentation image.

In specific implementation, pixels in the presentation image may be traversed to detect all the objects having a quadrilateral outline. However, because screen outline detection is time-consuming, in specific implementation, the image detection range may be first determined, and an object with a quadrilateral outline is detected in the determined image detection range.

Optionally, the image detection range may be determined according to at least one of the following information: information about a movement of the presentation screen picture in the presentation image, information about a hand position, in the presentation image, of a presenter that presents an operation performed on the terminal, and information about a preset area range.

In specific implementation, when presenting the operation performed on the terminal, the presenter generally moves the terminal, and a background image in the presentation image generally does not change. Therefore, an image detection range may be determined according to information about a change of the presentation screen picture in the presentation image such that the determined image detection range includes a changed picture. Besides, considering a characteristic of an application scenario, the terminal is generally near a hand. Therefore, the image detection range may be determined according to a hand position of the presenter in the presentation image, where the hand position may be detected using, for example, an existing Kinect-based gesture recognition algorithm and the like. In addition, an area range may further be preset as the image detection range according to a height of the presenter, a size of a presentation screen, a limitation on a position of the presenter, and the like. In specific implementation, the image detection range may be determined according to a comprehensive analysis of the foregoing three types of information, for example, an intersection set or a union set of image detection ranges that are obtained based on the three types of information is used as a finally determined image detection range.

After the image detection range is determined, the presentation screen picture matching the detection parameter information of the terminal may be detected in the presentation image according to the screen resolution (the aspect ratio of the corresponding terminal) of the terminal, the placement status information (such as a horizontal screen, a vertical screen, and a placement oblique angle), an area (the area may be determined based on the screen resolution of the terminal and a zoom ratio corresponding to the presentation image during shooting) of the presentation screen picture of the terminal.

Step S202: Determine a mapping relationship between a pixel on the presentation screen picture and a pixel on a display screen of the terminal according to parameter information of the presentation screen picture and screen parameter information of the terminal.

Herein, a pixel, which corresponds to a pixel on the presentation screen picture, on the display screen of the terminal may be determined according to the presentation screen picture of the terminal in the detected presentation image and the screen parameter information of the terminal, and a related operation instruction is performed based on the mapping relationship. Two specific mapping manners are described after step S203.

Step S203: Determine, according to first position information of an operation (information about a first pixel set that is operated on the presentation screen picture) by a user on the presentation screen picture of the terminal in the presentation image and the mapping relationship, second operation position information (information about a second pixel set on the display screen of the terminal), which corresponds to the first operation position information, on the display screen of the terminal, and control the terminal according to the second operation position information and operation action information.

Optionally, after the information about the second pixel set, which corresponds to the first pixel set, on the display screen of the terminal is obtained, a track icon may further be moved, on the display screen of the terminal, to a position of the second pixel set.

Figure 3A:
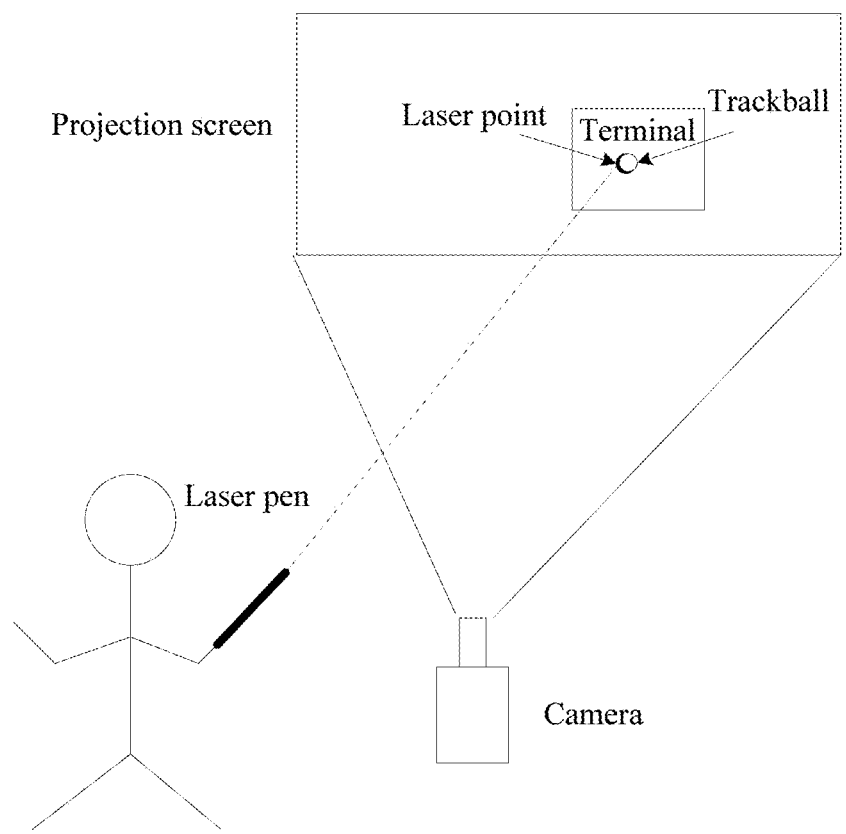
FIG. 3A is a schematic diagram of operating a screen picture of a terminal in a presentation image.
Figure 3B:
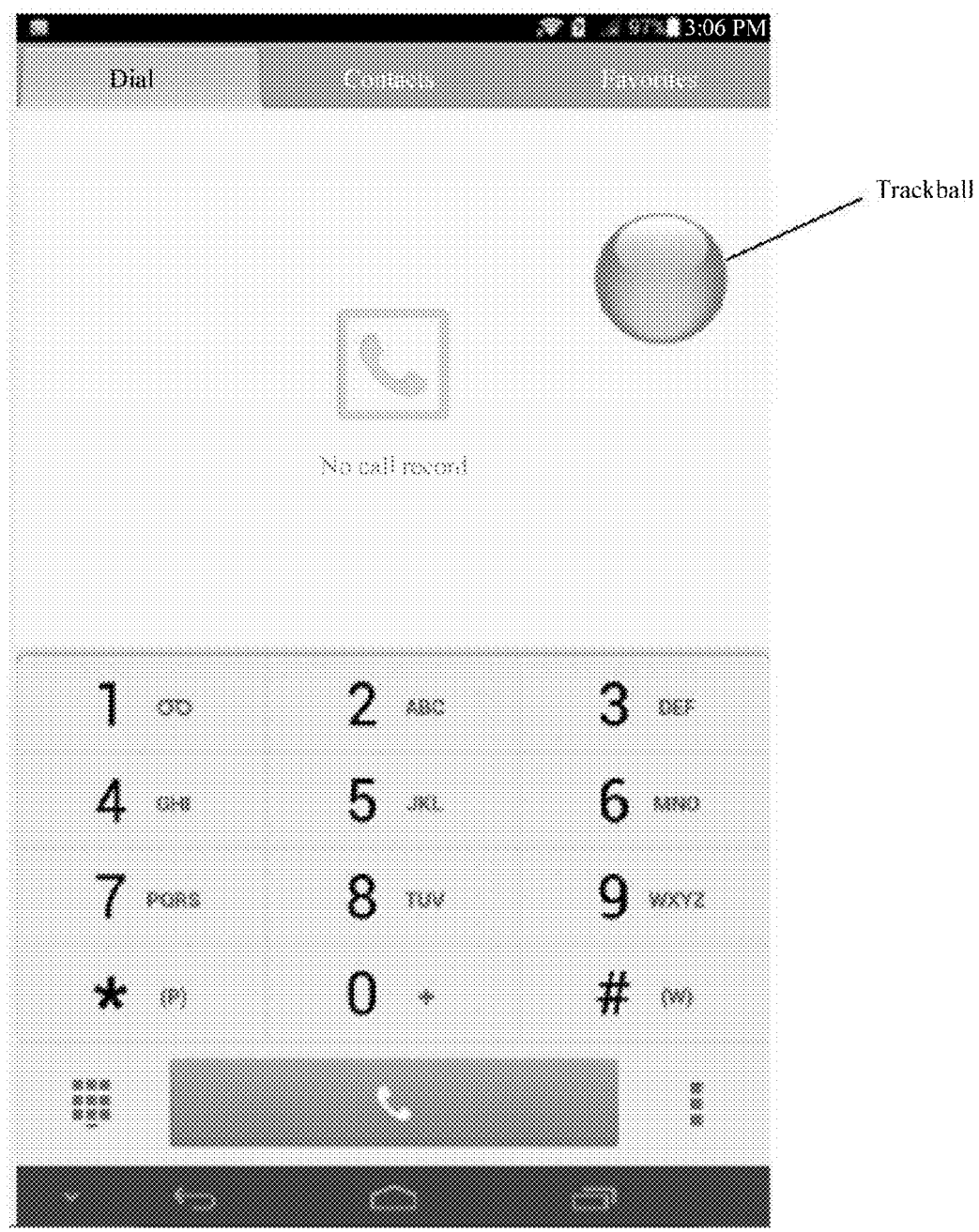
FIG. 3B is a schematic diagram of moving a trackball on a screen of a terminal according to a position to which a laser point moves.

In specific implementation, an operation action indicated by the operation action information may be a click operation, a sliding operation, and the like. In addition, a roaming operation of a visitor (a user performing an operation based on the presentation screen picture of the terminal in the presentation image) may further be displayed on the display screen based on the second operation position information. The roaming operation herein refers to an operation of moving an indication icon on the presentation screen picture, for example, the visitor uses a laser pen, points a laser point at the presentation screen picture, and moves the laser point. For the roaming operation, in order to enable the presenter to see a track of the roaming operation of the visitor, a track icon may be set on the display screen of the terminal such that the track icon moves according to an operation position of the roaming operation. As shown in FIG. 3A, the visitor points the laser point, emitted by the laser pen, at the presentation screen picture of the terminal in the presentation image, and moves the laser point. In this case, the track icon (which may be a trackball) moves on the display screen of the terminal according to a position to which the laser point moves, as shown in FIG. 3B.

A manner for determining the mapping relationship in step S202 is further described below.

In step S202, the mapping relationship between a pixel on the presentation screen picture and a pixel on the display screen of the terminal is determined according to the parameter information of the presentation screen picture and the screen parameter information of the terminal. This embodiment of the present disclosure provides the following two manners for determining the mapping relationship.

Manner 1: A placement status of the terminal is a default state. For example, the direction of the top edge (shown in FIG. 4A) of the display screen of the terminal is a horizontal direction, and the direction of the side edge of the display screen of the terminal is a vertical direction. The screen parameter information includes the screen resolution of the terminal. The parameter information of the presentation screen picture includes a width value of the presentation screen picture, a height value of the presentation screen picture, and coordinate values, in the presentation image, of a reference pixel on the presentation screen picture.

Furthermore, the mapping relationship between a pixel on the presentation screen picture of the terminal in the presentation image and a pixel on the display screen of the terminal is determined according to the width value (which may be indicated using a quantity of pixels) of the presentation screen picture, the height value of the presentation screen picture (which may be indicated using a quantity of pixels), the coordinate values, in the presentation image, of the reference pixel on the presentation screen picture, and the screen resolution of the terminal.

Figure 4A:
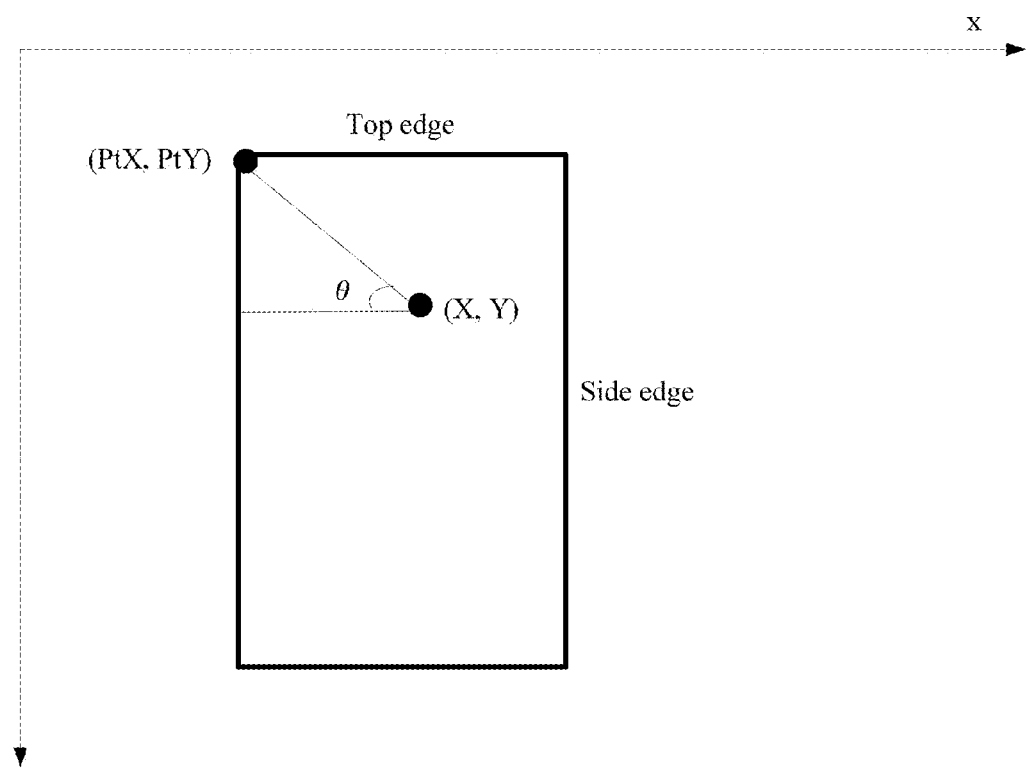
FIG. 4A is a schematic diagram of calculating a mapping relationship when an oblique angle β=0.

For example, as shown in FIG. 4A, the mapping relationship between a pixel on the presentation screen picture and a pixel on the display screen of the terminal may be determined according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel on the display screen, TrX is resolution of the display screen of the terminal in the direction of the top edge, that is, a width value of the display screen, TrY is resolution of the display screen of the terminal in the direction of the side edge, that is, a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

In FIG. 4A, an origin of coordinates in the presentation image is a pixel in an upper left corner of the presentation image. In the presentation image, a direction of the x-axis is a horizontal and rightward direction, and a direction of the y-axis is a vertical and downward direction. An origin of coordinates on the display screen of the terminal is a pixel in an upper left corner of the display screen of the terminal when the terminal is in the default placement state (the direction of the top edge of the display screen is a horizontal direction, and the direction of the side edge of the display screen is a vertical direction, for example, in a vertical screen state). On the display screen of the terminal, the direction of the x-axis is a horizontal and rightward direction when the terminal is in the default placement state, and the direction of the y-axis is a vertical and downward direction when the terminal is in the default placement state.

Herein, it should be noted that the foregoing formulas are just one of instances of manner 1, and any idea based on manner 1 and an instance obtained through simple variations of the foregoing formulas all fall within the protection scope of the present disclosure.

Manner 2: A placement status of the terminal has an oblique angle relative to the reference state (for example, the foregoing default state). The screen parameter information includes the screen resolution of the terminal and the placement status information. The parameter information of the presentation screen picture includes the width value of the presentation screen picture, the height value of the presentation screen picture, and the coordinate values, in the presentation image, of the reference pixel on the presentation screen picture.

Furthermore, the mapping relationship between a pixel on the presentation screen picture and a pixel on the display screen is determined according to the width value of the presentation screen picture, the height value of the presentation screen picture, the coordinate values of the reference pixel in the presentation image, the screen resolution of the terminal, and the placement status information of the terminal.

In specific implementation, the placement status information may include an oblique angle of the placement status of the terminal relative to the reference state, where the oblique angle is an angle by which the placement status of the terminal rotates on the presentation image along a counterclockwise direction relative to the reference state. When the placement status of the terminal is the reference state, the direction of the top edge of the display screen is a horizontal direction, and the direction of the side edge of the display screen is a vertical direction. The mapping relationship between a pixel on the presentation screen picture and a pixel on the display screen of the terminal may be determined according to the following formulas:

$$Gx = \frac{CW\sqrt{(X-PtX)^2(Y-PtY)^2}\cos\theta}{TrX}, \text{ and}$$

$$Gy = \frac{CH\sqrt{(X-PtX)^2(Y-PtY)^2}\sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and θ is an angle value that is determined based on an angle value β of the oblique angle, or θ is an angle value of a first acute included angle between a connection line, which is between the pixel (X, Y) and the reference pixel (PtX, PtY), and the direction of the top edge of the display screen (θ may also be an angle value of an obtuse included angle between a connection line, which is between the pixel (X, Y) and the reference pixel (PtX, PtY), and the direction of the top edge of the display screen, and in this case, sin θ and cos θ in the foregoing formulas are absolute values).

Figure 4B:
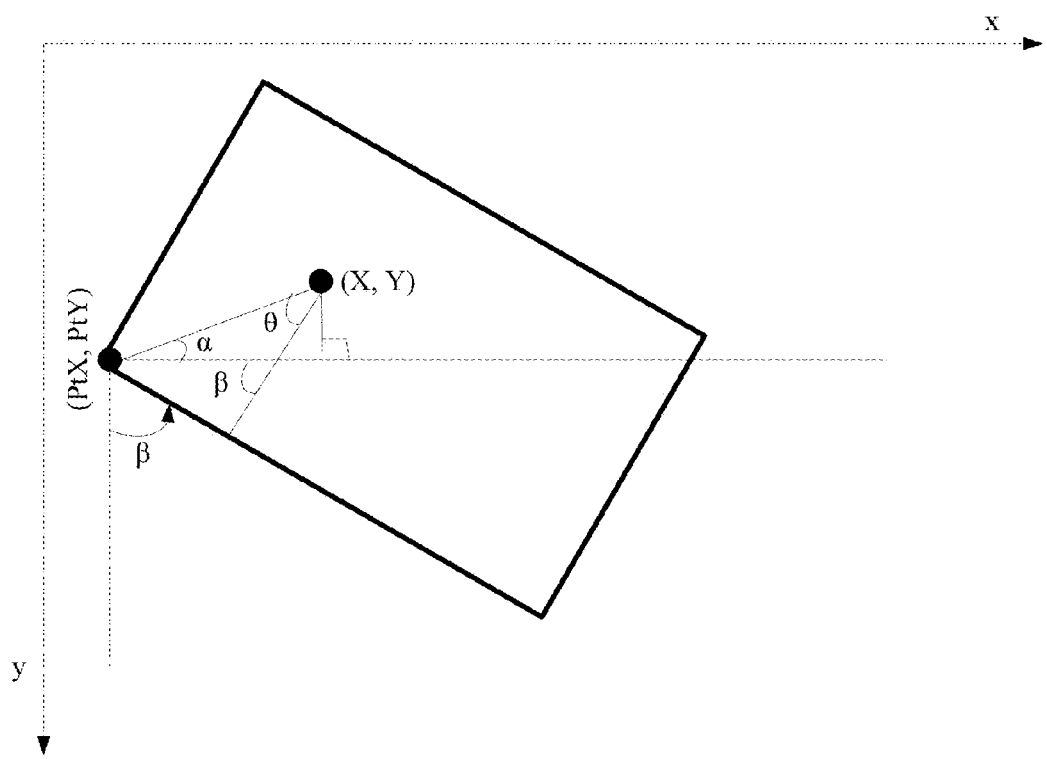
FIG. 4B is a schematic diagram of calculating a mapping relationship when $0<\beta\leq\pi/2$.
Figure 4C:
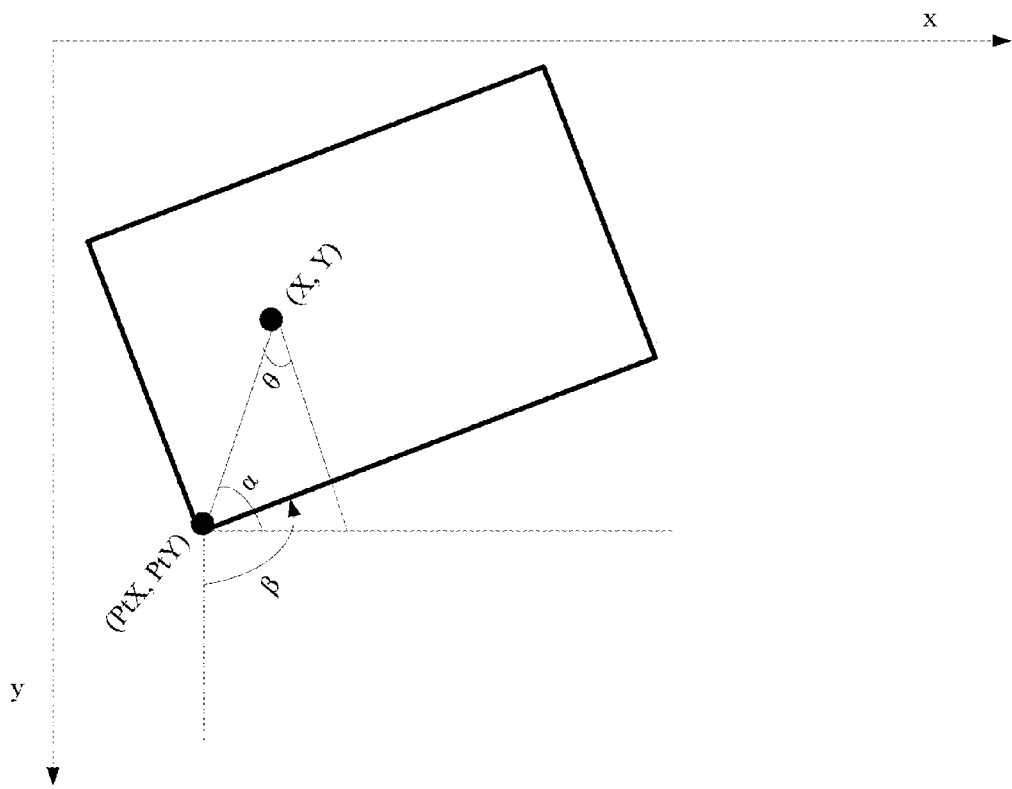
FIG. 4C is a schematic diagram of calculating a mapping relationship when $\pi/2<\beta<\pi$.
Figure 4D:
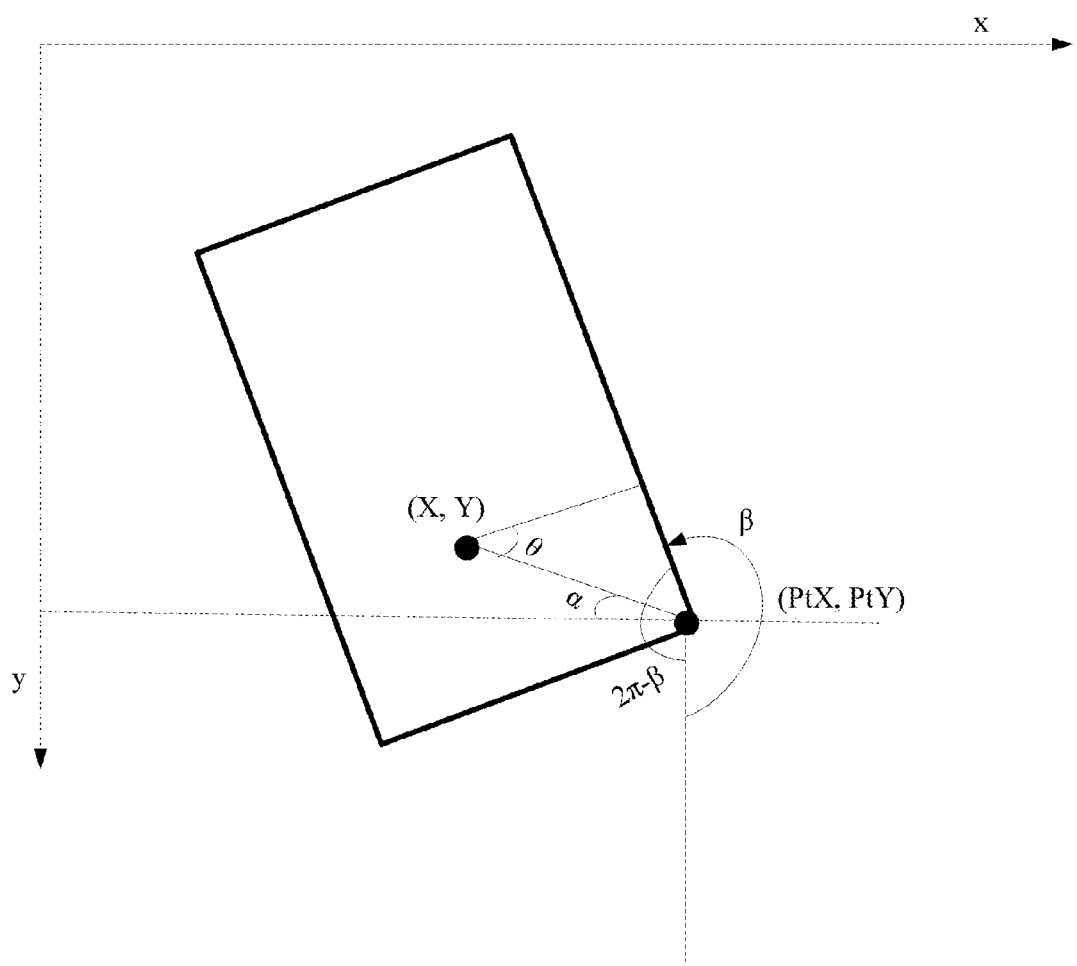
FIG. 4D is a schematic diagram of calculating a mapping relationship when $\pi\leq\beta<3\pi/2$.
Figure 4E:
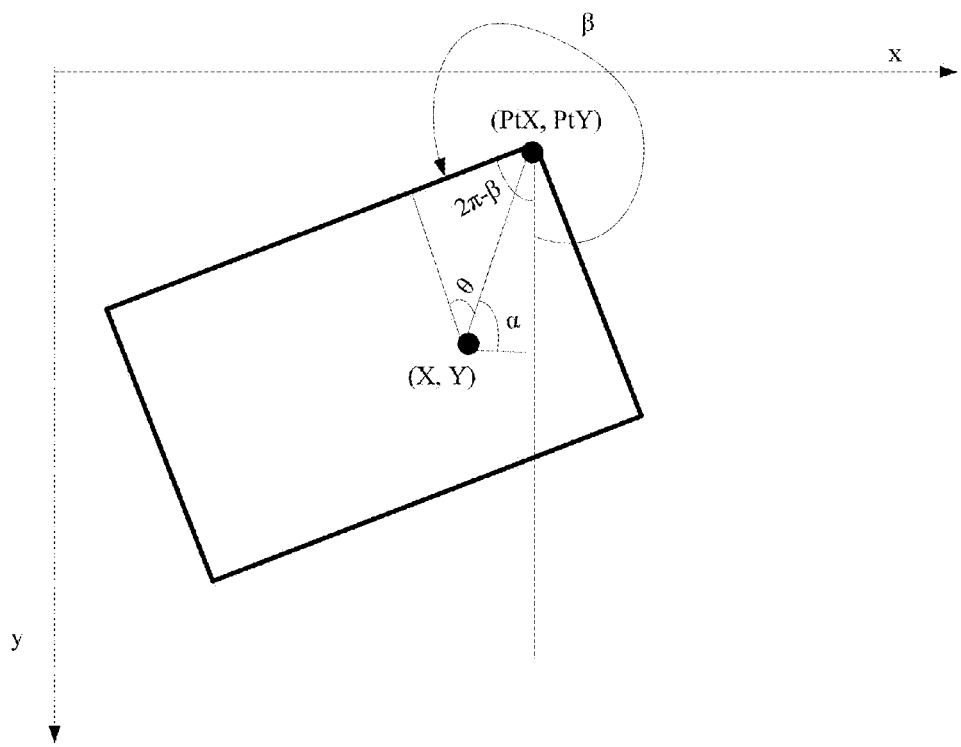
FIG. 4E is a schematic diagram of calculating a mapping relationship when $\beta\geq3\pi/2$.

In specific implementation, based on different angle values β of the oblique angle, specific calculation manners of θ are also different. An example in which the default placement state in the foregoing manner 1 is the reference state is used as shown in FIG. 4A, β=0, and in this case, θ=α,
as shown in FIG. 4B, 0<β≤π/2, and in this case, θ=β−α,
as shown in FIG. 4C, π/2<β<π, and in this case, θ=β−α,
as shown in FIG. 4D, π≤β<3π/2, and in this case, θ=α+β−π, and
as shown in FIG. 4E, β≥3π/2, and in this case, θ=β−α−π, where $$\alpha = \arccos\frac{|X-PtX|}{\sqrt{(X-PtX)^2+(Y-PtY)^2}} \text{ or}$$

$$\alpha = \arcsin\frac{|Y-PtY|}{\sqrt{(X-PtX)^2+(Y-PtY)^2}}.$$

In FIG. 4A, FIG. 4B, FIG. 4C, FIG. 4D, and FIG. 4E, the origin of coordinates in the presentation image is a pixel in an upper left corner of the presentation image. In the presentation image, the direction of the x-axis is a horizontal and rightward direction, and the direction of the y-axis is a vertical and downward direction. The origin of coordinates on the display screen of the terminal is a pixel in an upper left corner of the display screen of the terminal when the terminal is in the default placement state (the direction of the top edge of the display screen is a horizontal direction, and the direction of the side edge of the display screen is a vertical direction, for example, in a vertical screen state). On the display screen of the terminal, the direction of the x-axis is a horizontal and rightward direction when the terminal is in the default placement state, and the direction of the y-axis is a vertical and downward direction when the terminal is in the default placement state.

In order to better describe an idea that this embodiment of the present disclosure supports remote control, descriptions are provided below from the perspective of a system.

Embodiment 3

Figure 5:
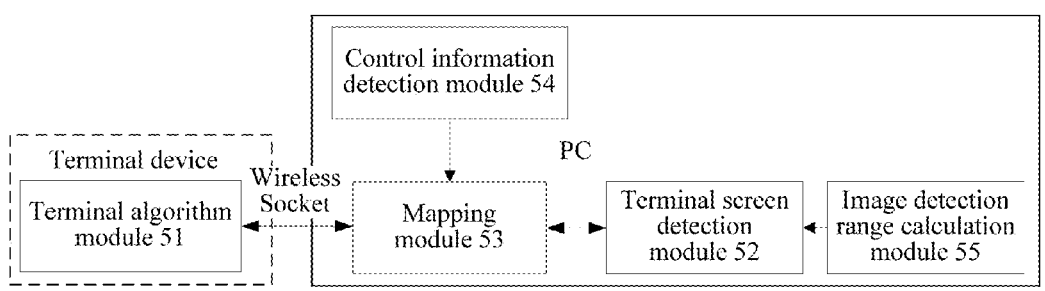
FIG. 5 is a schematic architectural diagram of a system supporting remote control according to Embodiment 3 of the present disclosure.

FIG. 5 is a schematic architectural diagram of a system supporting remote control according to Embodiment 3 of the present disclosure. In this system, an entity for executing the steps of the foregoing methods is a device, for example, a PC, independent of a terminal, and the terminal may transmit parameter information to the PC using a wireless socket.

In this system, main modules for implementing functions of this embodiment of the present disclosure include a terminal algorithm module 51, deployed at a terminal, configured to transmit parameter information (such as screen resolution and placement status information) of the terminal to a mapping module 53, and respond to a control instruction (for example, respond to a click, sliding, or roaming operation of a visitor) transmitted by the mapping module 53, a terminal screen detection module 52, deployed at a PC end, configured to detect a quadrilateral outline in an image detection range determined by an image detection range calculation module 55, search all detected quadrilateral outlines for a quadrilateral outline matching the parameter information of the terminal transmitted by the mapping module 53, and use an image in the found quadrilateral outline as a presentation screen picture of the terminal. The mapping module 53, deployed at the PC end, configured to receive the parameter information of the terminal transmitted by the terminal algorithm module 51, and transmit the parameter information to the terminal screen detection module 52, generate a mapping relationship between a pixel on the presentation screen picture of the terminal in a presentation image and a pixel on a display screen of the terminal according to the parameter information of the terminal and the presentation screen picture of the terminal that is detected by the terminal screen detection module 52, and convert, according to the generated mapping relationship, operation information transmitted by a operation information detection module 54 into a control instruction for the terminal, and transmit the control instruction to the terminal algorithm module 51. The operation information detection module 54, deployed at the PC end, configured to detect operation information (for example, a roaming operation that is performed by a visitor using a hand-held laser pen, or a click operation) of a user, and send the operation information to the mapping module 53, and the image detection range calculation module 55, deployed at the PC end, configured to determine an image detection range according to detected information about a hand position of a presenter, and transmit the image detection range to the terminal screen detection module 52.

Descriptions about application scenarios of this embodiment of the present disclosure are as follows.

This embodiment of the present disclosure not only may be applied to a presentation scenario of a terminal product, but also is applicable to another scenario in which remote control is needed, for example, may be further applicable to an auxiliary control scenario similar to family care, a remote visual scenario of generating a handwritten signature, and the like.

Scenario 1: Terminal Product Presentation.

Figure 6:
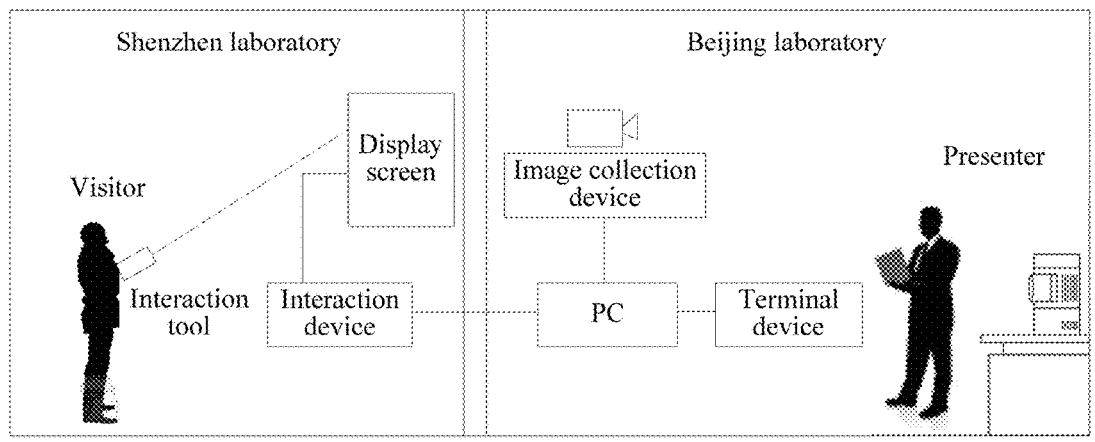
FIG. 6 is a schematic diagram of an application in a presentation scenario according to an embodiment of the present disclosure.

As shown in FIG. 6, a presenter takes a terminal, where a display screen of the terminal faces towards an image collection device. A network transmission module in a PC transmits a presentation image collected by the image collection device to a remote end, and presents the presentation image to a visitor at the remote end by means of a display screen at the remote end. The visitor may clearly see a presentation screen picture of the terminal by means of the display screen, and may remotely perform an operation on the presentation screen picture using an interaction tool. An interaction device detects information about an operation by the visitor, and transmits the information about the operation to a PC at a presentation end. The PC generates a control instruction for the terminal with reference to the information about the operation at the remote end and the determined mapping relationship between a pixel on the presentation screen picture of the terminal in the presentation image and a pixel on the display screen of the terminal, and transmits the control instruction to the terminal. The terminal responds to the received control instruction, and the presenter may see, through feedback of the display screen of the terminal, an operation by a local visitor.

Scenario 2: Assisted Operation.

Figure 7:
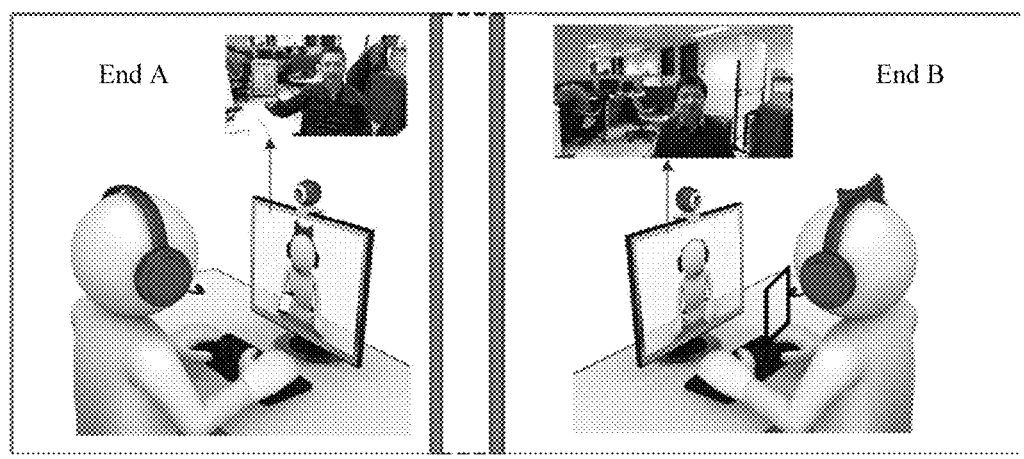
FIG. 7 is a schematic diagram of an application in a home remote video chat scenario according to an embodiment of the present disclosure.

As shown in FIG. 7, in a home remote video chat scenario, a member at an end A may see, by means of a video chat window, a terminal hand-held by a member at an end B, and the terminal is wiredly or wirelessly connected to a PC, which is used for video chatting, of the member at the end B. The member at the end A may control, using a mouse, the terminal hand-held by the member at the end B, and an implementation manner is the same as that described in the foregoing embodiment. A terminal is detected in a presentation image received by a PC, which is used for video chatting, at the end A, the mapping relationship is generated, detected information about the operation by the member at the end A is converted into an operation instruction for the terminal based on the mapping relationship, the operation instruction is sent to the terminal at the end B, and the terminal at the end B responds to the operation instruction.

Scenario 3: Remote Visual Handwritten Signature.

As digital handwritten signature becomes more widespread, a manner of generating a digital handwritten signature locally already cannot meet a signature requirement, for example, if only a locally-signed file is transmitted to a remote end, both security and user experience are not satisfactory. Remote visual handwritten signature may be implemented using this embodiment of the present disclosure.

Figure 8:
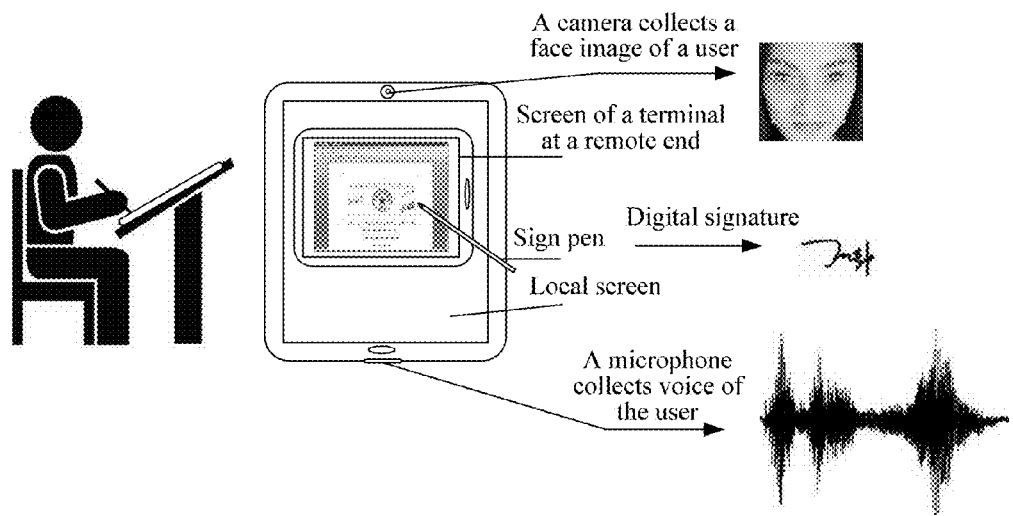
FIG. 8 is a schematic diagram of an application in a remote visual scenario of generating a handwritten signature according to an embodiment of the present disclosure.

As shown in FIG. 8, on a local terminal screen, a signer (which corresponds to the visitor in the foregoing scenario 1) may see a to-be-signed document on a display screen of a terminal at a remote end, the signer may hand-hold a signing tool (for example, a sign pen) to sign at a signing position of the to-be-signed document, and information about an operation (for example, signature track information) is transmitted to the remote end. At the remote end, the information about the operation by the signer is mapped to a control instruction for the terminal according to a generated mapping relationship, that is, the display screen of the terminal is controlled to display a signature track of the signer.

Besides the signature track, a terminal camera may be further used to collect a visual biometric feature, for example, a face, of the signer, a terminal microphone is used to collect voice data of the signer, a multi-modal signature for a specific target file is generated with reference to multiple characteristics. During signature authentication, authentication may also be performed by collecting data, such as the face, voice, and a signature track of the user. This multi-modal signature manner can improve signature authentication security.

Based on the same disclosure concept, the embodiments of the present disclosure further provide a remote control apparatus corresponding to the remote control method. Because the principle for resolving a problem by the apparatus is similar to that of the remote control method in the embodiments of the present disclosure, for implementation of the apparatus, reference may be made to the implementation of the method, and repeated content is not described again.

Embodiment 4

Figure 9:
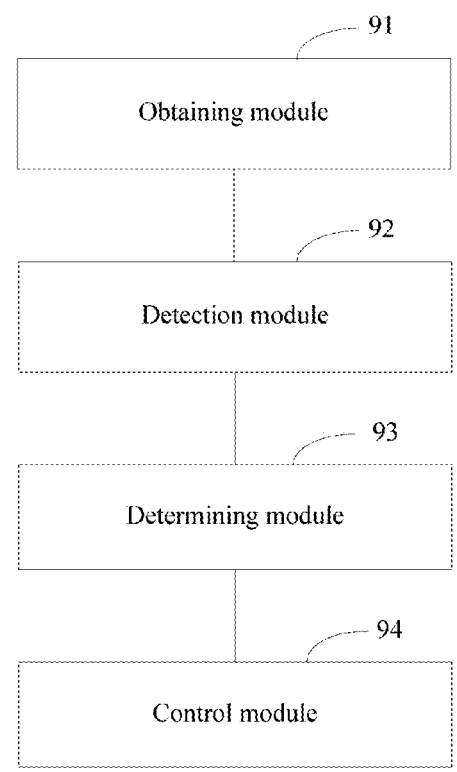
FIG. 9 is a schematic structural diagram of a remote control apparatus according to Embodiment 4 of the present disclosure.

FIG. 9 is a schematic structural diagram of a remote control apparatus according to Embodiment 4 of the present disclosure. The remote control apparatus includes an obtaining module 91, configured to obtain a presentation image, where the presentation image is an image used to present an operation performed on a terminal, a detection module 92, configured to detect, according to detection parameter information of the terminal, a presentation screen picture in the presentation image obtained by the obtaining module 91, where the presentation screen picture is a screen picture of the terminal in the presentation image, a determining module 93, configured to determine a mapping relationship between a pixel on the presentation screen picture and a pixel on a display screen of the terminal according to parameter information of the presentation screen picture detected by the detection module 92 and screen parameter information of the terminal, and a control module 94, configured to control the terminal according to information about an operation by a user on the presentation screen picture, and the mapping relationship determined by the determining module 93.

Optionally, the information about the operation includes operation action information and first operation position information, and the first operation position information includes information about a first pixel set that is operated on the presentation screen picture, and the control module 94 is further configured to obtain information about a second pixel set, which corresponds to the first pixel set, on the display screen of the terminal according to the information about the first pixel set and the mapping relationship, and control the terminal according to the information about the second pixel set and the operation action information.

Optionally, the information about the operation includes first operation position information, and the first operation position information includes information about a first pixel set that is operated on the presentation screen picture, and the control module 94 is further configured to obtain information about a second pixel set, which corresponds to the first pixel set, on the display screen of the terminal according to the information about the first pixel set and the mapping relationship, and move, on the display screen of the terminal, a track icon to a position of the second pixel set.

Optionally, the parameter information of the presentation screen picture includes at least one of the following information a width value of the presentation screen picture, a height value of the presentation screen picture, and coordinate values, in the presentation image, of a reference pixel on the presentation screen picture, and the screen parameter information includes screen resolution of the terminal, and the determining module 93 is further configured to determine the mapping relationship between a pixel on the presentation screen picture and a pixel on the display screen according to the width value of the presentation screen picture, the height value of the presentation screen picture, the coordinate values, in the presentation image, of the reference pixel on the presentation screen picture, and the screen resolution of the terminal.

Optionally, the determining module 93 is further configured to determine the mapping relationship between a pixel on the presentation screen picture and a pixel on the display screen of the terminal according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

Optionally, the screen parameter information of the terminal includes placement status information of the terminal and screen resolution of the terminal, and the parameter information of the presentation screen picture includes a width value of the presentation screen picture, a height value of the presentation screen picture, and coordinate values, in the presentation image, of a reference pixel on the presentation screen picture, and the determining module 93 is further configured to determine the mapping relationship between a pixel on the presentation screen picture and a pixel on the display screen according to the width value of the presentation screen picture, the height value of the presentation screen picture, the coordinate values of the reference pixel in the presentation image, the screen resolution of the terminal, and the placement status information of the terminal.

Optionally, the placement status information includes an oblique angle of a placement status of the terminal relative to a reference state, where the oblique angle is an angle by which the placement status of the terminal rotates on the presentation image along a counterclockwise direction relative to the reference state, when the placement status of the terminal is the reference state, a direction of a top edge of the display screen is a horizontal direction, and a direction of a side edge of the display screen is a vertical direction. The determining module 93 is further configured to determine the mapping relationship between a pixel on the presentation screen picture and a pixel on the display screen of the terminal according to the following formulas:

$$Gx = \frac{CW\sqrt{(X - PtX)^2(Y - PtY)^2}\cos\theta}{TrX}, \text{ and}$$

$$Gy = \frac{CH\sqrt{(X - PtX)^2(Y - PtY)^2}\sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and $\theta$ is an angle value that is determined based on an angle value $\beta$ of the oblique angle, or $\theta$ is an angle value of a first acute included angle between a connection line, which is between the pixel (X, Y) and the reference pixel (PtX, PtY), and the direction of the top edge of the display screen.

Optionally, the determining module 93 is further configured to, when the angle value $\beta$ of the oblique angle is 0, determine that the angle value $\theta$ of the first acute included angle is $\alpha$, where $\alpha$ is an angle value of a second acute included angle between a connection line, which is between the pixel (X, Y) and the reference pixel (PtX, PtY), and a horizontal direction, or when the angle value $\beta$ of the oblique angle is greater than 0, and the angle value $\beta$ of the oblique angle is less than $\pi$, determine that the angle value $\theta$ of the first acute included angle is a difference obtained by subtracting an angle value $\alpha$ from the angle value $\beta$ of the oblique angle, or when the angle value $\beta$ of the oblique angle is greater than or equal to $\pi$, and the angle value $\beta$ of the oblique angle is less than $3\pi/2$, determine that the angle value $\theta$ of the first acute included angle is a value obtained by subtracting $\pi$ from a sum of the angle value $\beta$ of the oblique angle and an angle value $\alpha$, or when the angle value $\beta$ of the oblique angle is greater than or equal to $3\pi/2$, and the angle value $\beta$ of the oblique angle is less than $2\pi$, determine that the angle value $\theta$ of the first acute included angle is a value obtained by subtracting an angle value $\alpha$ and $\pi$ from the angle value $\beta$ of the oblique angle.

Optionally, the detection parameter information of the terminal includes at least one of the following information: an aspect ratio of the terminal, the screen resolution of the terminal, and the placement status information of the terminal.

Optionally, the mapping parameter information of the terminal includes at least one of the following information: the screen resolution of the terminal, the placement status information of the terminal, and a width value and a height value of the terminal.

Optionally, the detection module 92 is further configured to detect all objects having a quadrilateral outline in the presentation image, and find out a presentation screen picture having a quadrilateral outline of the terminal from all the detected objects having a quadrilateral outline, where the quadrilateral outline of the terminal matches the detection parameter information of the terminal.

Optionally, the detection module 92 is further configured to detect all the objects having a quadrilateral outline in a determined image detection range of the presentation image.

Optionally, the detection module 92 is further configured to determine the image detection range according to at least one of the following information, which includes information about a movement of the presentation screen picture in the presentation image, information about a hand position, in the presentation image, of a presenter that presents an operation performed on the terminal, and information about a preset area range.

Embodiment 5

Figure 10:
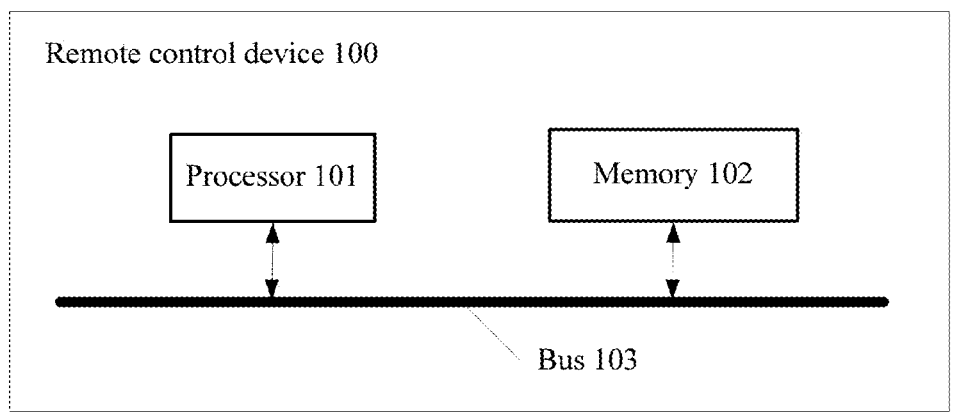
FIG. 10 is a schematic structural diagram of a remote control device according to Embodiment 5 of the present disclosure.

FIG. 10 is a schematic structural diagram of a remote control device 100 according to Embodiment 5 of the present disclosure. The remote control device 100 includes a processor 101, a memory 102, and a bus 103, where the memory 102 stores an executable instruction, and when the remote control device 100 runs, the processor 101 communicates with the memory 102 using the bus 103 such that the processor 101 performs the following executable instructions: obtaining a presentation image, where the presentation image is an image used to present an operation performed on a terminal; detecting a presentation screen picture in the presentation image according to detection parameter information of the terminal, where the presentation screen picture is a screen picture of the terminal in the presentation image; determining a mapping relationship between a pixel on the presentation screen picture and a pixel on a display screen of the terminal according to parameter information of the presentation screen picture and screen parameter information of the terminal, and controlling the terminal according to information about an operation by a user on the presentation screen picture, and the mapping relationship.

Optionally, the information about the operation includes operation action information and first operation position information, and the first operation position information includes information about a first pixel set that is operated on the presentation screen picture, and in the executable instruction performed by the processor 101, controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and controlling the terminal according to the information about the second pixel set and the operation action information.

Optionally, the information about the operation includes first operation position information, and the first operation position information includes information about a first pixel set that is operated on the presentation screen picture, and in the executable instruction performed by the processor 101, controlling the terminal according to information about an operation by a user on the presentation screen picture, and the mapping relationship includes obtaining information about a second pixel set, which corresponds to the first pixel set, on the display screen of the terminal according to the information about the first pixel set and the mapping relationship, and moving, on the display screen of the terminal, a track icon to a position of the second pixel set.

Optionally, the parameter information of the presentation screen picture includes at least one of the following information: a width value of the presentation screen picture, a height value of the presentation screen picture, and coordinate values, in the presentation image, of a reference pixel on the presentation screen picture, and the screen parameter information includes screen resolution of the terminal, and in the executable instruction performed by the processor 101, determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values, in the presentation image, of the reference pixel on the presentation screen picture, and the screen resolution of the terminal.

Optionally, in the executable instruction performed by the processor 101, the mapping relationship between a pixel on the presentation screen picture and a pixel on the display screen of the terminal is determined according to the following formulas:

$$Gx = \frac{(X - PtX)CW}{TrX}, \text{ and}$$

$$Gy = \frac{(Y - PtY)CH}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

Optionally, the screen parameter information of the terminal includes placement status information of the terminal and screen resolution of the terminal, and the parameter information of the presentation screen picture includes a width value of the presentation screen picture, a height value of the presentation screen picture, and coordinate values, in the presentation image, of a reference pixel on the presentation screen picture, and in the executable instruction performed by the processor 101, determining a mapping relationship between a pixel on the presentation screen picture and a pixel on a display screen of the terminal according to parameter information of the presentation screen picture and screen parameter information of the terminal includes determining the mapping relationship between a pixel on the presentation screen picture and a pixel on the display screen according to the width value of the presentation screen picture, the height value of the presentation screen picture, the coordinate values of the reference pixel in the presentation image, the screen resolution of the terminal, and the placement status information of the terminal.

Optionally, the placement status information may include an oblique angle of a placement status of the terminal relative to a reference state, where the oblique angle is an angle by which the placement status of the terminal rotates on the presentation image along a counterclockwise direction relative to the reference state, when the placement status of the terminal is the reference state, a direction of a top edge of the display screen is a horizontal direction, and a direction of a side edge of the display screen is a vertical direction, in the executable instruction performed by the processor 101, the mapping relationship between a pixel on the presentation screen picture and a pixel on the display screen of the terminal is determined according to the following formulas:

$$Gx = \frac{CW\sqrt{(X - PtX)^2(Y - PtY)^2} \cos\theta}{TrX}, \text{ and}$$

$$Gy = \frac{CH\sqrt{(X - PtX)^2(Y - PtY)^2} \sin\theta}{TrY},$$

where (X, Y) are coordinate values of a pixel on the presentation screen picture, (Gx, Gy) are coordinate values of a pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and θ is an angle value that is determined based on an angle value β of the oblique angle, or θ is an angle value of a first acute included angle between a connection line, which is between the pixel (X, Y) and the reference pixel (PtX, PtY), and the direction of the top edge of the display screen.

Optionally, in the executable instruction performed by the processor 101, determining the angle value θ of the first acute included angle based on the angle value β of the oblique angle includes, when the angle value β of the oblique angle is 0, determining that the angle value θ of the first acute included angle is α, where α is an angle value of a second acute included angle between a connection line, which is between the pixel (X, Y) and the reference pixel (PtX, PtY), and a horizontal direction, or when the angle value β of the oblique angle is greater than 0, and the angle value β of the oblique angle is less than π, determining that the angle value θ of the first acute included angle is a difference obtained by subtracting an angle value α from the angle value β of the oblique angle, or when the angle value β of the oblique angle is greater than or equal to π, and the angle value β of the oblique angle is less than 3π/2, determining that the angle value θ of the first acute included angle is a value obtained by subtracting π from a sum of the angle value β of the oblique angle and an angle value α, or when the angle value β of the oblique angle is greater than or equal to 3π/2, and the angle value β of the oblique angle is less than 2π, determining that the angle value θ of the first acute included angle is a value obtained by subtracting an angle value α and π from the angle value β of the oblique angle.

Optionally, the detection parameter information of the terminal includes at least one of the following information: an aspect ratio of the terminal, the screen resolution of the terminal, and the placement status information of the terminal.

Optionally, the mapping parameter information of the terminal includes at least one of the following information: the screen resolution of the terminal, the placement status information of the terminal, and a width value and a height value of the terminal.

Optionally, in the executable instruction performed by the processor 101, the detecting a presentation screen picture in the presentation image according to detection parameter information of the terminal includes detecting all objects having a quadrilateral outline in the presentation image, and finding out a presentation screen picture having a quadrilateral outline of the terminal from all the detected objects having a quadrilateral outline, where the quadrilateral outline of the terminal matches the detection parameter information of the terminal.

Optionally, in the executable instruction performed by the processor 101, detecting all objects having a quadrilateral outline in the presentation image includes detecting all the objects having a quadrilateral outline in a determined image detection range of the presentation image.

Optionally, in the executable instruction performed by the processor 101, the image detection range is determined according to at least one of the following information, which includes information about a movement of the presentation screen picture in the presentation image, information about a hand position, in the presentation image, of a presenter that presents an operation performed on the terminal, and information about a preset area range.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A remote control method, comprising:
obtaining a presentation image, wherein the presentation image presents an operation performed on a terminal;
detecting a presentation screen picture in the presentation image based, at least in part, on detection parameter information of the terminal, wherein the presentation screen picture comprises an image of the terminal in the presentation image;
determining a mapping relationship between a pixel on the presentation screen picture and a pixel on a display screen of the terminal based, at least in part, on parameter information of the presentation screen picture and screen parameter information of the terminal; and
controlling the terminal based, at least in part, on information about an operation on the presentation screen picture and the mapping relationship, wherein detecting the presentation screen picture in the presentation image comprises:
detecting all objects having a quadrilateral outline in the presentation image; and
detecting the presentation screen picture having a quadrilateral outline of the terminal from all the objects having the quadrilateral outline, wherein the quadrilateral outline of the terminal matches the detection parameter information of the terminal.

2. The method of claim 1, wherein the information about the operation comprises operation action information and first operation position information, wherein the first operation position information comprises information about a first pixel set that is operated on the presentation screen picture, and wherein controlling the terminal according to information about the operation comprises:
obtaining information about a second pixel set, corresponding to the first pixel set, on the display screen of the terminal based, at least in part, on the information about the first pixel set and the mapping relationship; and
controlling the terminal according to the information about the second pixel set and the operation action information.

3. The method of claim 1, wherein the information about the operation comprises first operation position information comprising information about a first pixel set that is operated on the presentation screen picture, and wherein controlling the terminal according to information about the operation by the user comprises:
obtaining information about a second pixel set, corresponding to the first pixel set, on the display screen of the terminal based, at least in part, on the information about the first pixel set and the mapping relationship; and
moving, on the display screen of the terminal, a track icon to a position of the second pixel set.

4. The method of claim 1, wherein the parameter information of the presentation screen picture comprises at least one of: a width value of the presentation screen picture; a height value of the presentation screen picture; and coordinate values in the presentation image of a reference pixel on the presentation screen picture, wherein the screen parameter information comprises screen resolution of the terminal, and wherein determining the mapping relationship between the pixel on the presentation screen picture and the pixel on the display screen of the terminal comprises determining the mapping relationship between the pixel on the presentation screen picture and the pixel on the display screen based, at least in part, on the width value of the presentation screen picture, the height value of the presentation screen picture, the coordinate values in the presentation image of the reference pixel on the presentation screen picture, and the screen resolution of the terminal.

5. The method of claim 4, wherein the mapping relationship between the pixel on the presentation screen picture and the pixel on the display screen of the terminal is determined based, at least in part, on the following formulas:

$$Gx = \frac{(X - PtX)CW}{TrX}; \text{ and}$$

$$Gy = \frac{(Y - PtY)CH}{TrY},$$

wherein (X, Y) are coordinate values of the pixel on the presentation screen picture, (Gx, Gy) are coordinate values of the pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, and the reference pixel corresponds to an origin of coordinates on the display screen.

6. The method of claim 1, wherein the screen parameter information of the terminal comprises placement status information of the terminal and screen resolution of the terminal, wherein the parameter information of the presentation screen picture comprises a width value of the presentation screen picture, a height value of the presentation screen picture, and coordinate values in the presentation image of a reference pixel on the presentation screen picture, and wherein determining the mapping relationship between the pixel on the presentation screen picture and the pixel on the display screen of the terminal comprises determining the mapping relationship between the pixel on the presentation screen picture and the pixel on the display screen based, at least in part, on the width value of the presentation screen picture, the height value of the presentation screen picture, the coordinate values of the reference pixel in the presentation image, the screen resolution of the terminal, and the placement status information of the terminal.

7. The method of claim 6, wherein the placement status information comprises an oblique angle of a placement status of the terminal relative to a reference state, wherein the oblique angle is an angle by which the placement status of the terminal rotates on the presentation image along a counterclockwise direction relative to the reference state, wherein when the placement status of the terminal is the reference state, a direction of a top edge of the display screen is a horizontal direction, and a direction of a side edge of the display screen is a vertical direction, wherein the mapping relationship between the pixel on the presentation screen picture and the pixel on the display screen of the terminal is determined based, at least in part, on the following formulas:

$$Gx = \frac{CW\sqrt{(X-PtX)^2(Y-PtY)^2}\cos\theta}{TrX}; \text{ and}$$

$$Gy = \frac{CH\sqrt{(X-PtX)^2(Y-PtY)^2}\sin\theta}{TrY},$$

wherein (X, Y) are coordinate values of the pixel on the presentation screen picture, (Gx, Gy) are coordinate values of the pixel which corresponds to (X, Y) on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and wherein $\theta$ is one of: an angle value that is determined based, at least in part, on an angle value $\beta$ of the oblique angle, or an angle value of a first acute included angle between a connection line between the pixel (X, Y) and the reference pixel (PtX, PtY) and the direction of the top edge of the display screen.

8. The method of claim 7, wherein determining the angle value $\theta$ of the first acute included angle based, at least in part, on the angle value $\beta$ comprises:
determining that the angle value $\theta$ is $\alpha$, wherein $\alpha$ is an angle value of a second acute included angle between the connection line and the horizontal direction when the angle value $\beta$ is 0;
determining that the angle value $\theta$ is a difference obtained by subtracting the angle value $\alpha$ from the angle value $\beta$ when the angle value $\beta$ is greater than 0, and the angle value $\beta$ is less than $\pi$;
determining that the angle value $\theta$ is a value obtained by subtracting $\pi$ from a sum of the angle value $\beta$ and the angle value $\alpha$ when the angle value $\beta$ is greater than or equal to $\pi$, and the angle value $\beta$ is less than $3\pi/2$; and
determining that the angle value $\theta$ is the value obtained by subtracting the angle value $\alpha$ and $\pi$ from the angle value $\beta$ when the angle value $\beta$ is greater than or equal to $3\pi/2$, and the angle value $\beta$ is less than $2\pi$.

9. The method of claim 1, wherein detecting all objects having the quadrilateral outline in the presentation image comprises detecting all the objects having the quadrilateral outline in an image detection range of the presentation image.

10. The method of claim 9, wherein the image detection range is determined based, at least in part, on one of the following information:
information about a movement of the presentation screen picture in the presentation image;
information about a hand position, in the presentation image, of a presenter that presents the operation performed on the terminal; and
information about a preset area range.

11. A remote control apparatus, comprising:
a memory; and
a processor coupled to the memory, the processor configured to:
obtain a presentation image, wherein the presentation image presents an operation performed on a terminal;
detect, based, at least in part, on detection parameter information of the terminal, a presentation screen picture in the presentation image, wherein the presentation screen picture comprises an image of the terminal in the presentation image;
determine a mapping relationship between a pixel on the presentation screen picture and a pixel on a display screen of the terminal based, at least in part, on parameter information of the presentation screen picture and screen parameter information of the terminal; and
control the terminal based, at least in part, on information about an operation on the presentation screen picture and the determined mapping relationship, wherein the processor being configured to detect the presentation screen picture comprises the processor being configured to:
detect all objects having a quadrilateral outline in the presentation image; and
detect the presentation screen picture having a quadrilateral outline of the terminal from all the detected objects having the quadrilateral outline, wherein the quadrilateral outline of the terminal matches the detection parameter information of the terminal.

12. The apparatus of claim 11, wherein the information about the operation comprises operation action information and first operation position information, wherein the first operation position information comprises information about a first pixel set that is operated on the presentation screen picture, and wherein the processor is further configured to:
obtain information about a second pixel set, corresponding to the first pixel set, on the display screen of the terminal based, at least in part, on the information about the first pixel set and the mapping relationship; and
control the terminal according to the information about the second pixel set and the operation action information.

13. The apparatus of claim 11, wherein the information about the operation comprises first operation position information comprising information about a first pixel set that is operated on the presentation screen picture, and wherein the processor is further configured to:
obtain information about a second pixel set, corresponding to the first pixel set, on the display screen of the terminal based, at least in part, on the information about the first pixel set and the mapping relationship; and move, on the display screen of the terminal, a track icon to a position of the second pixel set.

14. The apparatus of claim 11, wherein the parameter information of the presentation screen picture comprises at least one of: a width value of the presentation screen picture; a height value of the presentation screen picture; and coordinate values in the presentation image of a reference pixel on the presentation screen picture, wherein the screen parameter information comprises screen resolution of the terminal, and wherein the processor is further configured to determine the mapping relationship between the pixel on the presentation screen picture and the pixel on the display screen based, at least in part, on the width value of the presentation screen picture, the height value of the presentation screen picture, the coordinate values, in the presentation image of the reference pixel on the presentation screen picture, and the screen resolution of the terminal.

15. The apparatus of claim 11, wherein the screen parameter information of the terminal comprises placement status information of the terminal and screen resolution of the terminal, wherein the parameter information of the presentation screen picture comprises a width value of the presentation screen picture, a height value of the presentation screen picture, and coordinate values in the presentation image of a reference pixel on the presentation screen picture, and wherein the processor is further configured to determine the mapping relationship between the pixel on the presentation screen picture and the pixel on the display screen based, at least in part, on the width value of the presentation screen picture, the height value of the presentation screen picture, the coordinate values of the reference pixel in the presentation image, the screen resolution of the terminal, and the placement status information of the terminal.

16. The apparatus of claim 15, wherein the placement status information comprises an oblique angle of a placement status of the terminal relative to a reference state, wherein the oblique angle is an angle by which the placement status of the terminal rotates on the presentation image along a counterclockwise direction relative to the reference state, wherein when the placement status of the terminal is the reference state, a direction of a top edge of the display screen is a horizontal direction and a direction of a side edge of the display screen is a vertical direction, wherein the processor is further configured to determine the mapping relationship between the pixel on the presentation screen picture and the pixel on the display screen of the terminal based, at least in part, on the following formulas:

$$Gx = \frac{CW\sqrt{(X - PtX)^2 (Y - PtY)^2}\cos\theta}{TrX}; \text{ and}$$

$$Gy = \frac{CH\sqrt{(X - PtX)^2 (Y - PtY)^2}\sin\theta}{TrY},$$

wherein (X, Y) are coordinate values of the pixel on the presentation screen picture, (Gx, Gy) are coordinate values of the pixel, which corresponds to (X, Y), on the display screen, TrX is a width value of the display screen, TrY is a height value of the display screen, CW is the width value of the presentation screen picture, CH is the height value of the presentation screen picture, (PtX, PtY) are coordinate values of the reference pixel in the presentation image, the reference pixel corresponds to an origin of coordinates on the display screen, and wherein θ is one of: an angle value that is determined based, at least in part, on an angle value β of the oblique angle, or an angle value of a first acute included angle between a connection line between the pixel (X, Y) and the reference pixel (PtX, PtY) and the direction of the top edge of the display screen.

17. The apparatus of claim 11, wherein the processor is further configured to detect all the objects having the quadrilateral outline in an image detection range of the presentation image.

18. The apparatus of claim 17, wherein the processor is further configured to determine the image detection range based, at least in part, on one of the following information:
information about a movement of the presentation screen picture in the presentation image;
information about a hand position, in the presentation image, of a presenter that presents the operation performed on the terminal; and
information about a preset area range.

* * * * *